United States Patent
Pieper

[11] Patent Number: 6,080,355
[45] Date of Patent: Jun. 27, 2000

[54] PROCESSING FOR PRODUCING DEFORMABLE ACRYLIC PANELS WITH INCREASED ABRASION AND SCRATCH RESISTANCE

[75] Inventor: Fritz Pieper, Alhen, Germany

[73] Assignee: Franz Kaldewei GmbH & Co., Ahlen, Germany

[21] Appl. No.: 09/085,426

[22] Filed: May 27, 1998

[30] Foreign Application Priority Data

May 28, 1997 [DE] Germany .................. 197 22 559

[51] Int. Cl.[7] .................. B29C 51/10
[52] U.S. Cl. .................. 264/512; 264/134; 264/510; 264/552; 264/553; 425/388
[58] Field of Search .................. 264/512, 552, 264/553, 134, 901, DIG. 78, 510; 425/388

[56] References Cited

U.S. PATENT DOCUMENTS

| | | | |
|---|---|---|---|
| 4,158,585 | 6/1979 | Wright | 156/94 |
| 4,750,967 | 6/1988 | Kott et al. | 156/499 |
| 4,877,571 | 10/1989 | Riefenhauser | 264/512 |
| 5,157,797 | 10/1992 | Forwick | 4/566.1 |
| 5,744,061 | 4/1998 | Bredol et al. | 252/301.65 |
| 5,814,270 | 3/1996 | Smith | 264/553 |
| 5,840,111 | 11/1998 | Wiederhoft et al. | 106/436 |

FOREIGN PATENT DOCUMENTS

| | | |
|---|---|---|
| 0659786B1 | 12/1994 | European Pat. Off. . |
| 4313715 | 11/1994 | Germany . |
| 4344577 | 6/1995 | Germany . |
| 4411439 | 10/1995 | Germany . |
| 2277931 | 4/1994 | United Kingdom . |
| WO 95/27001 | 3/1995 | WIPO . |

*Primary Examiner*—Jan H. Silbaugh
*Assistant Examiner*—Dae Young Lee
*Attorney, Agent, or Firm*—Collard & Roe, P.C.

[57] ABSTRACT

A process for producing deformable acrylic panels with increased resistance to abrasion and scratching preferably for sanitary articles to be produced by the deep-drawing process. Immediately prior to the deep-drawing step, a type of lacquer is applied to an acrylic panel. The lacquer contains dispersed nanoscale particles preferable of an inorganic material. The semifinished acrylic panel is heated and subsequently deep-drawn. The lacquer coating is applied to the semifinished acrylic panel with the help of rollers or a doctor blade. In addition, the lacquer coating can be applied by immersing or flooding the semifinished acrylic panel.

10 Claims, 2 Drawing Sheets

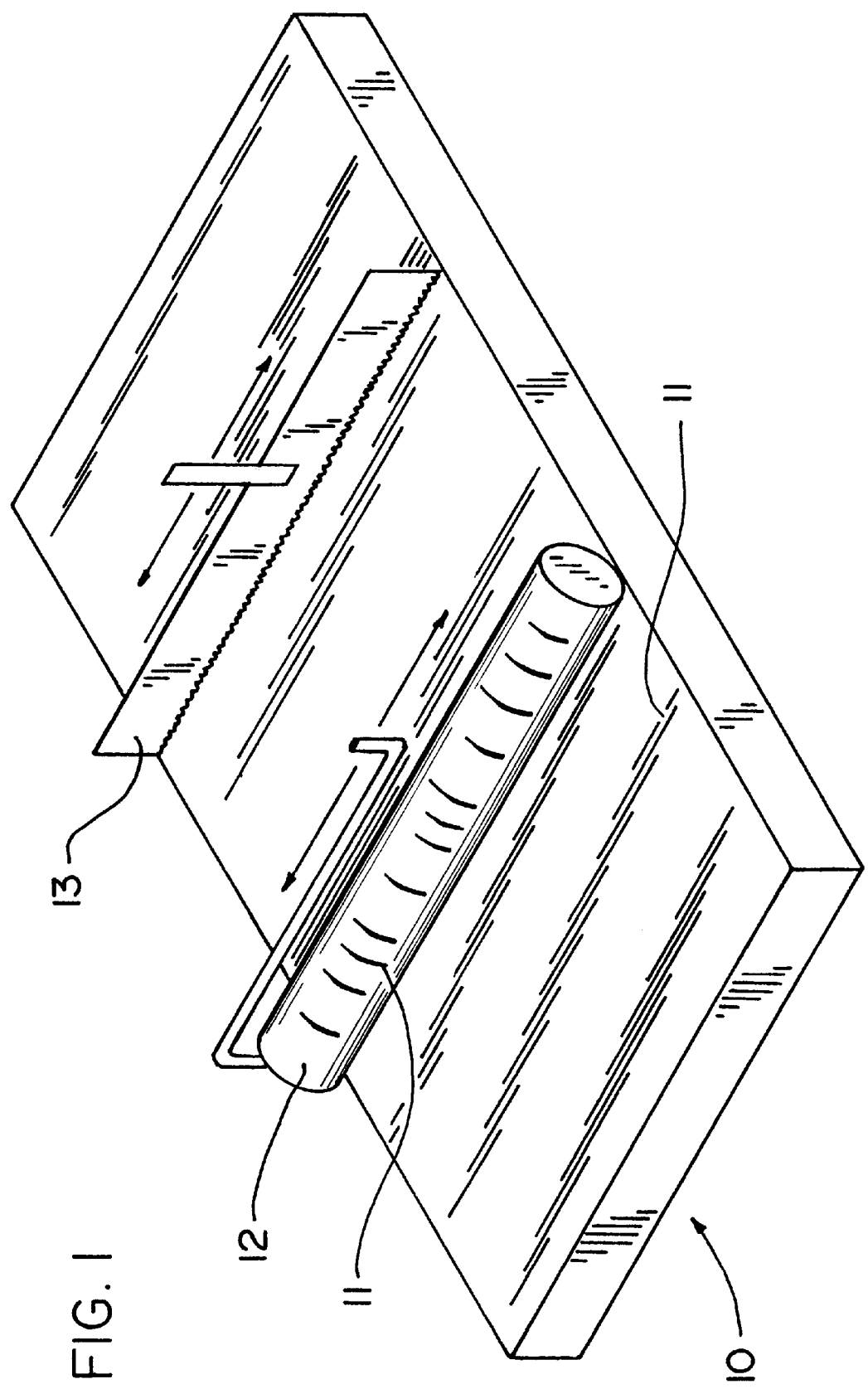

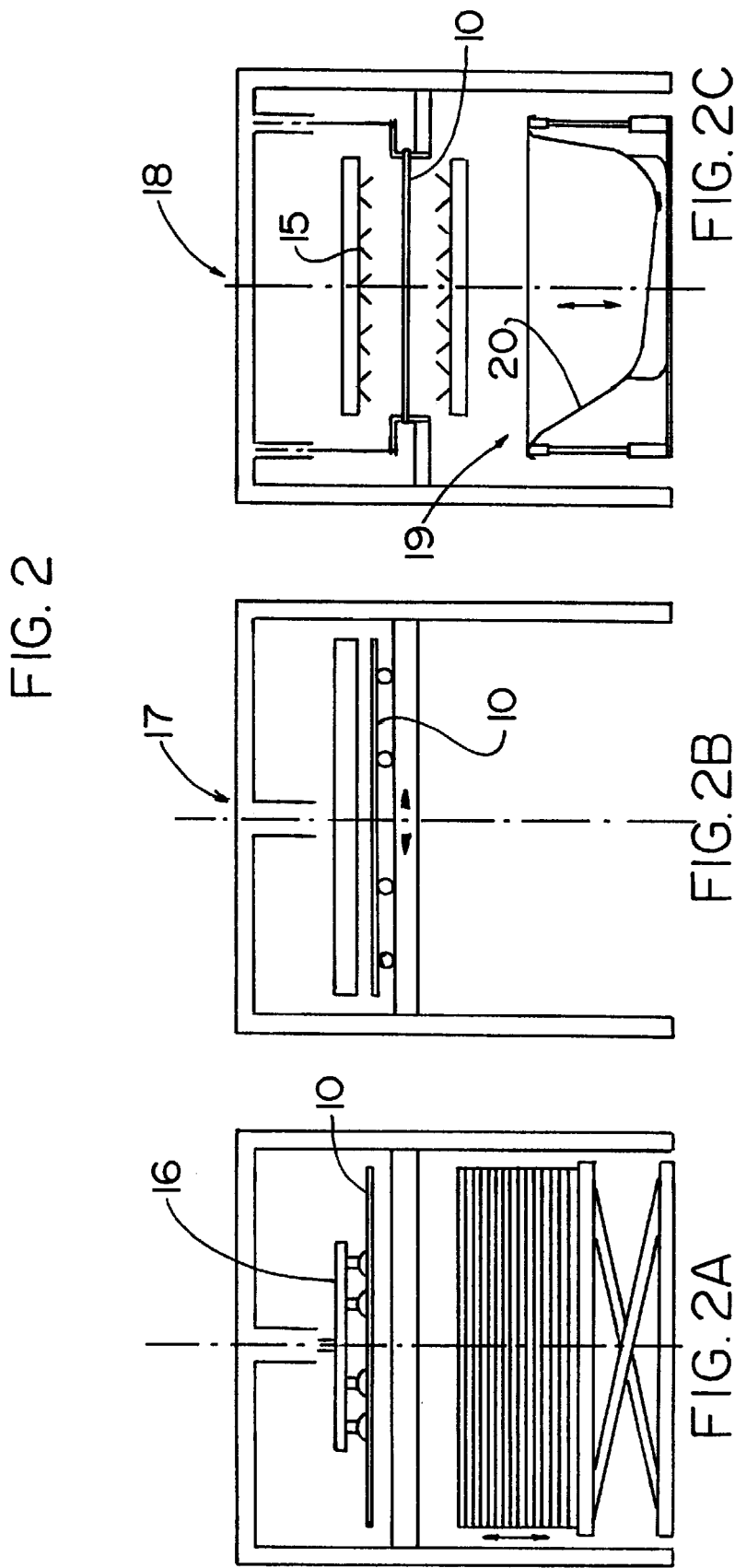

PROCESSING FOR PRODUCING DEFORMABLE ACRYLIC PANELS WITH INCREASED ABRASION AND SCRATCH RESISTANCE

BACKGROUND OF THE INVENTION

1. Field of the Invention

The present invention relates to a process for producing deformable acrylic panels with increased resistance to abrasion and scratching preferably for use with sanitary articles manufactured by the deep-drawing process. An example of sanitary articles would include bathtubs, shower tubs or the like.

2. The Prior Art

The prior art describes processes for manufacturing plastic sanitary articles based on polymethylmethacrylate. Plastic sanitary articles, like bathtubs or shower tubs, are mostly referred to as acrylic tubs and have properties which differ from steel-enamel tubs. German Patent DE 43 44 577 (A1), describes a process for the manufacture of acrylic tubs based on polymethylmethacrylate. It is known from the '577 patent to add particular inorganic fillers to the polymethylmethacrylate (PMMA). These inorganic fillers contain relatively fine particles; however, their particle size is still in the range of 20 to 60 μm. In the process disclosed in the '577 patent, the sanitary articles are not deep-drawn but rather produced by the casting resin process. The total casting resin suspension contains the so-called fillers, so that the latter are distributed over the entire volume of the finished PMMA-panel. In the above process, fillers are also used for the purpose of enhancing the thermal stability of the plastic sanitary articles.

Similarly, German patent DE 43 13 715 (A1), specifies the manufacture of polymer materials based on PMMA using particulate inorganic fillers whose size is greater than 10 μm. Foamed PMMA-materials, manufactured with this process, are less suitable for producing sanitary articles with surfaces exhibiting special resistance to abrasion and scratching. In addition, no provision is made for deforming the polymer materials by the deep-drawing process.

An expert in the field of sanitary article manufacture knows that the resistance of the surface of conventional acrylic tubs to abrasion and scratching is inadequate in most cases. After prolonged use, these acrylic tubs show traces of surface scratching and eventually become dull.

SUMMARY OF THE INVENTION

An object of the present invention is to make available a process for the manufacture of deformable acrylic panels with increased resistance to abrasion and scratching. The invention is suitable for producing sanitary articles by the deep-drawing process and permits industrial series production.

To overcome the disadvantages of the prior art, provision is made so that a type of lacquer is applied to the semifinished acrylic panel before the deep-drawing step. This lacquer contains dispersed, nanoscale particles preferably of an inorganic material. The semifinished acrylic panel, coated with the lacquer, may be used in a deep-drawing process.

A particular advantage of the invention is that sanitary articles can be manufactured from acrylic material having a surface with increased resistance to abrasion and scratching. In addition, these sanitary articles can be shaped using the deep drawing process into any desired form without adversely affecting the surface.

According to the present invention, the lacquer is preferably applied to the semifinished acrylic panel with the help of rollers or doctor blades. In addition, the lacquer can be applied by immersing or flooding the semi-finished acrylic panel. After the lacquer has been applied and before the deep-drawing step is caried out, the solvent contained in the lacquer should be permitted to evaporate so that partial cross-linking takes place.

According to the present invention, the following procedure is preferably applied. Initially, the acrylic panel, coated with the lacquer, is placed on a deep-drawing mold and heated to an elevated temperature with the help of heating radiators or the like. Finally, the coated acrylic panel is then heated to the deformation temperature with the help of heating radiators or the like so that no additional heat is required in the course of the deep-drawing step.

In the process as defined by the invention, the heating step prior to the deep-drawing step is comparatively long in terms of time as compared to the latter. For example, the heating step lasts a few minutes, while the subsequent deep-drawing step takes a few seconds.

The lacquer used to cost the semifinished acrylic panel contains nanoscale particles ranging in size from 10 to 100 nanometers and is preferably in the range of 60 to 80 nanometers. The particle size of the nanoscale particles is thus significantly smaller then that used in the prior art.

The nanoscale particles should be uniformly distributed in the lacquer applied to the semifinished acrylic panel. The concentration of the nanoscale particles in the lacquer should be between 1% and 50%, and is preferably in the range of about 2% and 30%.

Any desired crystalline particles can be used as nanoscale particles. Preferably, inorganic crystalline nanoscale particles such as, $TiO_2$, $SiO_2$, or $Al_2O_3$, are used.

The process disclosed in the present invention produces a strong bond between the acrylic panel, which forms the underground or the carrier layer, and the coating. Therefore, no cracking, peeling or other detachment of the coating will occur in the course of the deep-drawing step.

Prior to the deep-drawing step, heating radiators or similar heating devices raise the temperature of the acrylic panel above 150° C. In most cases, the deformation temperature is between 180° C. to 200° C. The deep-drawing step is preferably carried out under vacuum. Following the deep-drawing step, a cooling phase takes place which lasts a few minutes, and cools the panel to a temperature above room temperature. The blank of the sanitary article, created from the coated acrylic panel, is then removed from the mold.

It is an object of the invention to produce a composite material in which a solid and permanent bond exists between the acrylic plastic and the lacquer coating so that the adhesion of the coating to the acrylic panel is not impaired by the deep-drawing process. Heating of the panel and stretching of the material under vacuum and the cooling phase cause polymerization of the material and chemically bonds it with the acrylic board. In addition, a pore-free and smooth surface is obtained, which is similar to the surface of an uncoated acrylic panel. The cleaning of sanitary articles manufactured according to the process as defined by the invention poses no problems when such articles are in use. Furthermore, no germination of the material occurs in the event of bacteria infestation.

It is the further object of this invention to produce an acrylic article which can be machined without causing peel-off. Milling of the sanitary articles may be required to mount drain or overflow bores.

It is an object of the invention to produce a sanitary article which has increased resistance to chemicals, with no changes in color, as compared to articles made from conventional PMMA. Moreover, no loss of gloss occurs as compared to the original material. No differences are visible between the coated acrylic surface (PMMA-surface) and a corresponding uncoated acrylic material.

A final advantage of the invention is that no emissions occur as the system is almost closed. In addition, the process works with automatic execution.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings, wherein similar reference characters denote similar elements throughout the several views:

FIG. 1 shows a schematically simplified representation of the application of the lacquer to a semifinished acrylic glass plate; and FIGS. 2A, 2B, 2C and 2D show a schematically simplified representation of the various phases of the manufacture of an acrylic glass plate coated as defined by the invention.

DETAILED DESCRIPTION OF PREFERRED EMBODIMENTS

Turning now in detail to the drawings. Referring to FIG. 1, lacquer coating 11 is applied to a semifinished acrylic glass plate 10 (the acrylic glass blank), using a doctor blade 13 movable along semifinished acrylic glass plate 10 in the longitudinal direction. Alternatively, lacquer coating 11 can be applied to semifinished acrylic glass plate 10 with the help of one or more rollers 12 in the longitudinal or transverse direction. For the sake of simplicity both alternatives are shown here by only one representation.

Referring to FIG. 2A, a semifinished acrylic plate 10 (blank) is first collected from a stack of plates with the help of a semifinished plate loader 16 and transported to a lacquering station 17. shown in FIG. 2B.

Referring to FIG. 2B, the semifinished acrylic plate 10 is coated with lacquer 11 in the manner described by reference to FIG. 1. Application of lacquer 11 may take place in lacquering station 17. Subsequently, the coated semifinished acrylic plate 10 is conveyed by means of known conveyor devices to an automatic deep-drawing machine 18 shown in FIG. 2C.

Referring to FIG. 2C, the coated semifinished acrylic plate 10 is first heated by heating radiators 15, to the desired deformation temperature. The actual deep-drawing process takes place subsequently in deep-drawing device 19 arranged underneath, producing a sanitary article 20, for example a bathtub.

Referring to FIG. 2D, a sanitary article 20 is transported to an after-curing station 21. The surface of sanitary article 20 can be irradiated for after-curing the lacquer coating 11.

In the process as defined by the invention, the dwelling time in lacquering station 17 (deep-drawing process) serves for automatic leveling of the lacquer, evaporation of the solvent and for initiating cross-linking. The polymerization takes place during three stages, first, in the course of heating the plate, second, after-polymerization by the deep-drawing process, and finally in the course of the cooling phase. After-curing, if required, takes place in after-curing station 21.

Accordingly, while a few embodiments of the present invention have been shown and described, it is to be understood that many changes and modifications may be made thereunto without departing from the spirit and scope of the invention as defined in the appended claims.

What is claimed is:

1. A process for producing acrylic tubs with increased resistance to abrasion and scratching comprising the steps of:

a) applying a polymerizable lacquer coating to an acrylic panel wherein said lacquer coating contains dispersed inorganic nanoscale particles having a particle size between 10 nm and 100 nm;

b) positioning the panel above a deep-drawing mold;

c) heating the panel to an elevated temperature;

d) deep-drawing the panel into the mold thereby forming a tub; and e) cooling the panel to a temperature above room temperature;

wherein polymerization of the lacquer coating takes place during the steps (c)–(e).

2. The process according to claim 1, wherein the lacquer coating is applied to the acrylic panel via at least one roller or doctor blade.

3. The process according to claim 1, wherein the lacquer coating is applied to the panel by immersing or flooding the acrylic panel.

4. The process according to claim 1, further comprising the step of evaporating the solvent contained in the lacquer coating prior to step (b) so that partial cross-linking takes place in the lacquer.

5. The process according to claim 1, wherein the panel is heated during step (c) to a deformation temperature and said deep drawing step (d) is carried out without additional heating.

6. The process according to claim 1, wherein the inorganic particles have particle sizes between 60 nm and 80 nm.

7. The process according to claim 1, wherein the nanoscale particles consist of $TiO_2$, $SiO_2$ or $Al_2O_3$.

8. The process according to claim 1, further comprising the step of after-curing the lacquer coating, wherein said after-curing is performed in an after-curing station.

9. The process according to claim 1, wherein the lacquer coating is used in step (a) having a concentration of nanoscale particles between 1% and 50%.

10. The process according to claim 9, wherein the concentration of the nanoscale particles is between 2% and 30%.

* * * * *